(12) United States Patent
Kaiser-Feuerstein et al.

(10) Patent No.: US 12,025,903 B2
(45) Date of Patent: Jul. 2, 2024

(54) OPTICAL SYSTEM FOR USE IN AN UNDERWATER ENVIRONMENT

(71) Applicant: Carl Zeiss Jena GmbH, Jena (DE)

(72) Inventors: Andreas Kaiser-Feuerstein, Jena (DE); Mario Sondermann, Kreischa OT Quohren (DE); Andrea Berner, Jena (DE); Hans Lange, Jena (DE); Dirk Döring, Erfurt (DE); Uwe Weber, Aalen (DE); Tobias Hackel, Eisenach (DE)

(73) Assignee: Carl Zeiss Jena GmbH, Jena (DE)

( * ) Notice: Subject to any disclaimer, the term of this patent is extended or adjusted under 35 U.S.C. 154(b) by 693 days.

(21) Appl. No.: 17/271,455

(22) PCT Filed: Aug. 20, 2019

(86) PCT No.: PCT/EP2019/072261
§ 371 (c)(1),
(2) Date: Feb. 25, 2021

(87) PCT Pub. No.: WO2020/043552
PCT Pub. Date: Mar. 5, 2020

(65) Prior Publication Data
US 2021/0311375 A1      Oct. 7, 2021

(30) Foreign Application Priority Data

Aug. 31, 2018 (DE) ...................... 10 2018 121 367.0

(51) Int. Cl.
*G03B 17/08* (2021.01)
*G02B 7/02* (2021.01)
*G03B 17/14* (2021.01)

(52) U.S. Cl.
CPC ............. *G03B 17/08* (2013.01); *G02B 7/026* (2013.01); *G03B 17/14* (2013.01)

(58) Field of Classification Search
CPC ........ G03B 17/08; G03B 17/14; G03B 17/12; G02B 7/026; G02B 7/02; G02B 7/022; G02B 23/22
See application file for complete search history.

(56) References Cited

U.S. PATENT DOCUMENTS 4,295,721 A    10/1981 Rebikoff
4,856,880 A     8/1989 Ohshita
(Continued)

FOREIGN PATENT DOCUMENTS

CN    203849487 U    9/2014
CN    206900615 U    1/2018
(Continued)

OTHER PUBLICATIONS

Nov. 26, 2019 International Search Report issued on International Application No. PCT/EP2019/072261.
(Continued)

*Primary Examiner* — Stephone B Allen
*Assistant Examiner* — Adam W Booher
(74) *Attorney, Agent, or Firm* — Clements Bernard Walker; Christopher L. Bernard (57) ABSTRACT

An optical system (10) for use in an underwater environment is proposed, wherein the optical system (10) comprises a housing which delimits an interior (60) of the optical system (10) with respect to the surroundings (50) in water-tight fashion, and a lens (20) with an outer surface (24), wherein the housing comprises a mount (40), wherein the lens (20) is received in the mount (40) in such a way that the outer surface (24) of the lens (20) is in fluid contact with water of the underwater environment when the optical system (10) is situated in the underwater environment, wherein the outer surface (24) of the lens (20) has an arched form, in particular a convex form, preferably a spherical convex form, wherein
(Continued)

the lens (20) has a first arched contact face (28), in particular a spherical contact face, and the mount (40) has a second contact face (48), wherein the lens (20) is arranged in the mount (40) in such a way that the first contact face (28) presses against the second contact face (48) when the pressure of the surroundings (50) of the optical system (10) is greater than the pressure in the interior (60) of the optical system (10).

16 Claims, 3 Drawing Sheets

(56) References Cited

U.S. PATENT DOCUMENTS

| | | | |
|---|---|---|---|
| 6,654,179 | B2 | 11/2003 | Inoue |
| 9,470,870 | B2 * | 10/2016 | Lamontagne .......... G02B 7/022 |
| 2009/0244733 | A1 | 10/2009 | Sasaki et al. |
| 2010/0214677 | A1 | 8/2010 | Monti |
| 2012/0293878 | A1 | 11/2012 | Mori et al. |
| 2016/0091690 | A1 | 3/2016 | Nakajima |
| 2017/0059805 | A1 * | 3/2017 | Ranetkins .............. G02B 15/10 |
| 2019/0222729 | A1 * | 7/2019 | Yoshikawa ............ G03B 30/00 |

FOREIGN PATENT DOCUMENTS

| | | |
|---|---|---|
| DE | 1053306 A | 3/1959 |
| EP | 2746567 A1 | 6/2014 |
| JP | 2016071367 A | 5/2016 |
| KR | 20140002171 U | 4/2014 |

OTHER PUBLICATIONS

Leitz Canada, Water Contact Lens, Brochure 1977, pp. 1-7.
Sep. 28, 2022 Office Action and text issued with regard to parallel and/or related application CN 201980056184.4.

* cited by examiner

OPTICAL SYSTEM FOR USE IN AN UNDERWATER ENVIRONMENT

CROSS-REFERENCE TO RELATED APPLICATION(S)

This application is a U.S. National Stage Entry under 35 U.S.C. 371 of International Application No. PCT/EP/2019/072261 filed on Aug. 20, 2019, which claims priority to German Patent Application No. 10 2018 121 367.0 filed on Aug. 31, 2018, the contents of each of which are incorporated herein by reference in their entirety.

FIELD OF THE INVENTION

The invention relates to an optical system for use in an underwater environment.

BACKGROUND OF THE INVENTION

Optical systems, i.e., (camera) lenses in particular, which are used in underwater environments must withstand high pressures that act on the optical systems dependent on the diving depth. Usually, mechanical optical electrical systems are encapsulated from the water of the underwater environment by a housing in which quasi-constant (gas) pressure conditions prevail. Optical systems which should visually capture the surroundings or parts of the surroundings require an optically transparent interface to the surroundings (also referred to as an optical port) in the housing. To this end, the optical port comprises an optically transparent component made of an optical functional material (generally glass), which is in direct contact with the underwater environment. Consequently, the optically transparent component must withstand high pressures of the underwater environment, which depend on the diving depth, and pressure changes.

In previously known optical systems for use in an underwater environment, the functional requirements on the optically transparent component are primarily restricted to the mechanical load bearing capacity, i.e., to the mechanically sufficient delimitation with respect to load bearing capacity of the housing interior with respect to the ambient medium with an optical imaging effect that is as neutral as possible. Embodiments of the optically transparent components contained in the prior art are planar plates or concentric menisci/dome optical units, which are held and supported with respect to the housing on plane or conical design elements (e.g., 45° half aperture angle).

Consequently, the optically transparent component of optical systems in the prior art is used as an additional component that has a negatively influencing/non-conducive effect on the optical imaging properties. As a component disposed in front of an optical imaging system, the optically transparent component must have a sufficient aperture for the imaging properties demanded by the optical imaging system. As a result, the optically transparent component of the optical port, and hence its area exposed to the ambient pressure, is always greater than the functionally required dimensions of the first lens of the optical imaging system. As a result, there is a disadvantageous boundary condition for designing the transparent component of the optical port on account of the load which results from the ambient pressure and which is proportional to the area.

A disadvantage of optical systems corresponding to the prior art is that the optically transparent component represents an additional mandatory element in the system, which is under great loads due to the external pressure since, in general, it must be substantially larger than the functionally required dimensions of the first lens of an optical imaging system in order to offer a sufficient aperture to the latter, which is complicated to manufacture, especially in the case of the variants held at the edge, and which only achieves the optically neutral effect to a limited extent.

BRIEF SUMMARY OF THE INVENTION

The invention is based of the object of highlighting an optical system for use in an underwater environment, which has a high mechanical load bearing capacity, which has good optical properties and which is easy to produce from a technical point of view.

This object is achieved by an optical system as claimed in claim 1.

In particular, according to embodiments, this object is achieved by an optical system for use in an underwater environment, wherein the optical system comprises a housing which delimits an interior of the optical system with respect to the surroundings in water-tight fashion and a lens with an outer surface, wherein the housing comprises a mount, wherein the lens is received in the mount in such a way that the outer surface is in fluid contact with the water of the underwater environment when the optical system is situated in the underwater environment, wherein the outer surface of the lens has an arched form, in particular a convex form, preferably a spherical convex form, wherein the lens has a first (concavely or convexly) arched contact face, in particular a spherical contact face, and the mount has a second contact face, wherein the lens is arranged in the mount in such a way that the first contact face presses against the second contact face when the pressure of the surroundings of the optical system is greater than the pressure in the interior of the optical system.

An advantage of this optical system is that the lens can be an optically active component. This can reduce the number of parts of the optical system and increase the optical performance of the optical system. The dimensions of the lens or of the outer surface of the lens, and hence its area exposed to the external pressure, can be reduced to the optically functionally required extent. Moreover, the optical system has very good optical properties since the lens which is in contact with the water in the underwater environment can be designed or calculated accordingly. As a result of the form of the first contact face, it is possible to withstand the occurring, diving depth-dependent (changeable) forces in an underwater environment particularly well. Moreover, the first contact face can be produced cost-effectively with a particularly high degree of precision. In particular, the first contact face can be precisely produced in technically simple fashion using conventional optics methods and can be measured using conventional measurement methods, and it is possible to assess the quality of the first contact face. As a result, the lens and hence the optical system can withstand particularly high pressures without damage. The first contact face can immediately or directly touch/contact the second contact face or there can be an intermediate layer made of an additional material, i.e., a material not the same as the material of the lens and not the same as the material of the mount, present, at least in regions or over the entirety thereof, between the first contact face and the second contact face. The first contact face can touch only part of the second contact face or a part of the first contact face can press against the second contact face or a part of the second contact face in the underwater environment.

According to one embodiment, the center of the spherical form of the first contact face is located on an optical axis of the lens. An advantage thereof is that the first contact face can be produced in technically simple fashion with particularly high precision.

According to one embodiment, the lens has an inner surface opposite to the outer surface, wherein an optical axis of the lens extends through the outer surface and the inner surface and wherein the inner surface of the lens has an arched form, in particular a concave form, preferably a spherical concave form. An advantage thereof is that the optical system has a particularly small number of parts.

According to one embodiment, the first contact face of the lens has a convex form and the second contact face of the mount has a concave form with a radius of curvature that substantially corresponds to a radius of curvature of the convex form of the first contact face. As a result, there is a particularly large area contact between the first contact face and the second contact face. Consequently, the forces arising from the pressure of the underwater environment can be transferred into the mount with little tension. The second contact face can be produced by conventional machining methods, for example. The first contact face of the lens produced can be produced in a technically simple fashion using conventional optics manufacturing methods and can be measured and assessed very accurately with the aid of conventional measurement technology from the production of optical parts. As a result, in respect of the quality achieved, the lenses can be combined in optimal fashion with the second contact face of the mount.

According to one embodiment, the first contact face has a convex form, wherein the second contact face has a concave form, wherein the radius of curvature of the first contact face is smaller than the radius of curvature of the second contact face in a cross section along a plane containing the optical axis of the lens, and wherein the center of the concave form of the second contact face is not located on an optical axis of the lens. A circular line contact arises in the case of an ideal shape and rigidity of lens, mount and possibly present intermediate layer. In practice, a touching area or an area with Hertzian stresses, i.e., the area in which the first contact face and the second contact face touch, an annular or ring-shaped area which is formed symmetrically with respect to the optical axis of the lens, is formed in the contact region of the first and the second contact face. The resultant mechanical stress is influenced by the relative position (i.e., position and orientation) of the touching area or area with Hertzian stresses, by the ratio of the radii of curvature of the first contact face and second contact face, by the Young's modulus at the first contact face or lens and second contact face or mount, and by the material properties of the material of a possibly present intermediate layer. The form of the touching area or area with Hertzian stresses, and hence the basic contact situation, is maintained unchanged in the case of form and dimensional deviations of the lens geometry and/or mount geometry on account of manufacturing deviations and/or on account of the deformation by the load during operation. The relative position and manifestation of the touching area or area with Hertzian stresses change in the process. The first contact face and the second contact face can be designed or created or produced in such a way that the optical system can withstand particularly high pressures without damage.

According to one embodiment, an elastic intermediate layer and/or an adhesive is arranged between the first contact face and the second contact face. As a result, the forces or stressing occurring when deformations of the lens and/or of the mount occur can be distributed particularly well or uniformly and it is possible to reliably avoid the occurrence of local plastic deformations, in particular of the ductile mount components. Consequently, the optical system or the lens can reliably withstand even higher pressures.

According to one embodiment, the elastic intermediate layer and/or the adhesive is formed in such a way that a sealing effect between the lens and the mount is increased when the pressure on the outer surface of the lens increases. An advantage thereof is that the ingress of water into the region between the first contact face and the second contact face, and hence into the interior of the housing, is particularly reliably avoided by the self-reinforcing seal, even at high pressures.

According to one embodiment, the mount has an undercut, wherein faces of the undercut have a fluid connection with the underwater environment when the optical system is situated in the underwater environment. An advantage thereof is that a direct, short introduction of force in the region of the mount in the case of ambient pressure, or the pressure of the water, minimizes the bending load on the mount and hence the deformation occurring in the mount region, i.e., in the region of the first and second contact face. Consequently, this avoids a deformation of the mount and/or a substantial change in the form of the touching area or the area with Hertzian stresses on account of the mount bending. Consequently, the optical system can particularly reliably withstand particularly high pressures.

According to one embodiment, the undercut is embodied in such a way that, level with the undercut, the mount has a diameter perpendicular to the optical axis of the lens which substantially corresponds to the diameter of the lens perpendicular to the optical axis of the lens. An advantage thereof is that bending or deforming of the mount is minimized in the region of the lens or in the region of the second contact face. Consequently, the optical system can reliably withstand even higher pressures.

According to one embodiment, the optical system comprises further optical elements, in particular further lenses, wherein the further optical elements are rigidly connected to a part of the mount in such a way that, when the lens moves with the mount relative to the remaining parts of the housing, the further optical elements are moved along accordingly in such a way that there are substantially no changes in the distances between the lens and the further optical elements. An advantage thereof is that the imaging quality of the optical system remains unchanged, even in the case of a displacement of the lens or of the mount on account of loads at high pressures. The further optical elements are displaced together with the lens, and so there is no change in the distances between the further optical elements and the lens.

According to one embodiment, the first contact face of the lens is polished and/or etched. As a result, deep damage or microcracks or crack nuclei in the first contact face can reliably be removed or avoided/minimized in technically simple fashion. As a result, the forces arising can be transferred or guided particularly safely and reliably into the mount. Consequently, the optical system can reliably withstand even higher pressures.

According to one embodiment, the lens is arranged with pretension in the mount in such a way that the lens presses against the second contact face with its first contact face even if the pressure in the surroundings of the optical system equals the pressure in the interior of the optical system. In particular, the first lens can be pretensioned in such a way that the lens presses against the second contact face with a force that corresponds to a force at least 10 times, preferably at least 50 times, that of the normal pressure. This ensures that the position of the lens relative to the mount always remains the same, even in the case of the surroundings with normal pressure. This increases the reliability of the optical system.

According to one embodiment, a side face in the form of a lateral face of a cylinder is formed between the outer surface of the lens and the first contact face of the lens. This allows technically simple centration of the lens. Moreover, the side face can serve as a sealing face for sealing in conjunction with sealing elements.

According to one embodiment, the side face extends in coaxial fashion with respect to the optical axis of the lens. An advantage thereof is that the forces are transferred particularly reliably from the outer surface to the first contact face. Consequently, the lens can withstand high pressures particularly reliably.

According to one embodiment, the optical system further comprises a seal for sealing a region between the first contact face of the lens and the second contact face of the mount. This reliably prevents the ingress of water, even at high ambient pressures, in a technically simple manner. Moreover, the contact between the first contact face and the second contact face is independent of the seal. This increases the reliability of the optical system even further.

A spherical form of a surface can mean, in particular, that the surface is a spherical surface section.

In particular, the optical system can be embodied in such a way that it can withstand pressures occurring in deep-sea environments (>200 m) without damage. Moreover, the optical system can be embodied in such a way that, in particular, the optical system can withstand pressure differences occurring when surfacing or diving down into the deep sea without damage.

Preferred embodiments are evident from the dependent claims.

BRIEF DESCRIPTION OF THE DRAWINGS

The invention is explained in greater detail below with reference to drawings of exemplary embodiments. In the figures.

The same reference signs are used in the following description for identical parts and parts having an identical effect.

DETAILED DESCRIPTION OF THE INVENTION

Figure 1:
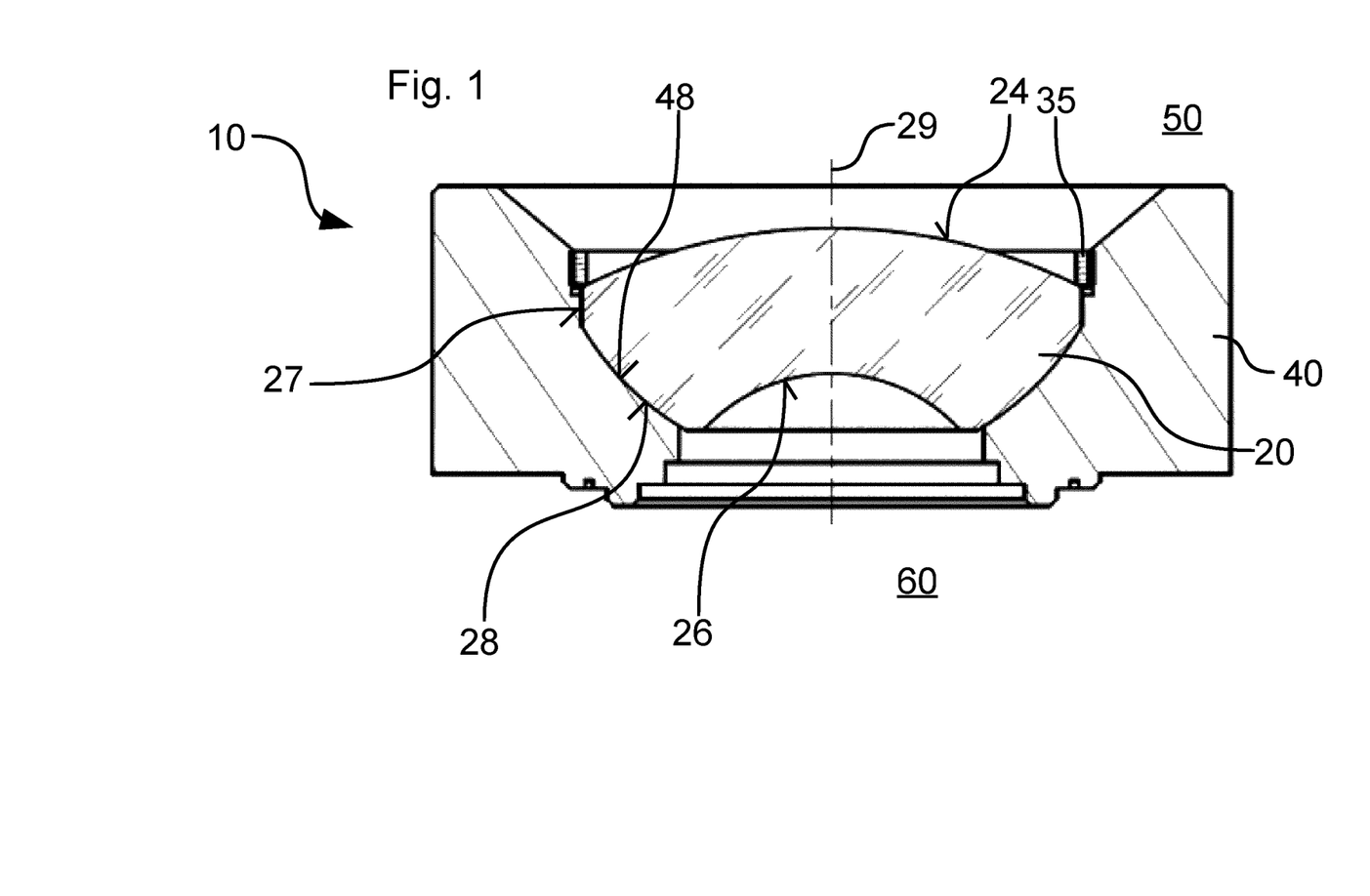
FIG. 1 shows a cross-sectional view of a first embodiment of the optical system according to the invention.

FIG. 1 shows a cross-sectional view of a first embodiment of the optical system 10 according to the invention. The optical system 10 comprises a lens 20 and a housing, wherein the lens 20 is received in a mount 40 of the housing. The housing delimits an interior 60 with respect to the surroundings 50. The optical system 10 is embodied for use in an underwater environment. This means that the optical system 10 and also the housing or the mount 40 can withstand high pressures (e.g., pressures of several hundred bars).

By way of example, the optical system 10 can be used for an underwater camera or can be an underwater camera.

The lens 20 represents an optical port, which forms an optically transmissive or transparent connection through the housing between the interior 60 and the surroundings 50. In this way, the light from the surroundings 50 can enter into the housing.

The lens 20 has an outer surface 24, which is embodied for contact with water. This means that water contacts or touches the outer surface 24 of the lens 20 when the optical system 10 is located in an underwater environment. Consequently, the lens 20 represents an outer boundary of the interior 60 with respect to the surroundings 50.

The outer surface 24 of the lens 20 has an arched form, i.e., the outer surface 24 of the lens 20 is not flat. The outer surface 24 of the lens 20 can have a spherical form. In FIG. 1, the outer surface 24 is a spherical convex form, i.e., arched toward the surroundings 50.

However, it is also conceivable for the outer surface 24 of the lens 20 to have an aspherical form. By way of example, the outer surface 24 can have a plurality of subsections, which each have a spherical form with radii of curvature that differ from one another.

It is also conceivable for the outer surface 24 of the lens 20 to have a spherical concave form, i.e., a form that is arched toward the interior 60.

The outer surface 24 of the lens 20 is opposite to an inner surface 26 of the lens 20. The optical axis 29 extends through the center of the lens 20, and consequently through the outer surface 24 and the inner surface 26. The inner surface 26 has a spherical concave form, i.e., arching away from the interior 60. The center of the curvature of the inner surface 26 is located on the optical axis 29 of the lens 20.

The lens 20 has a first contact face 28. The first contact face 28 faces the mount 40. The first contact face 28 lies opposite the outer surface 24. The first contact face 28 is formed for contacting a second contact face 48 of the mount 40. In FIG. 1, the first contact face 28 immediately or directly touches the second contact face 48 of the mount 40. This means that there is no further intermediate layer or the like between the first contact face 28 and the second contact face 48. Consequently, the first contact face 28 presses against the second contact face 48 if there is pressure against the outer surface 24 of the lens 20.

The first contact face 28 has a spherical form, wherein the center of the curvature of the first contact face 28 is located on the optical axis 29 of the lens 20. In FIG. 1, the first contact face 28 has a spherical convex form. The second contact face 48 has a spherical concave form. The center of the curvature of the second contact face 48 is located on the optical axis 29 of the lens 20.

In a manner of speaking, the first contact face 28 runs around the inner surface 26 of the lens 20. The first contact face 28 is a spherical chamfer or facet.

The radii of curvature of the first contact face 28 and of the second contact face 48 are of equal size or identical. As a result, the first contact face 28 and the second contact face 48 touch over a large area. Consequently, the first contact face 28 is embodied in complementary or congruent and concentric fashion with respect to the second contact face 48 in large parts. When the surroundings 50 or the water in the surroundings 50 press against the outer surface 24 of the lens 20, the first contact face 28 presses against the second contact face 48 over a large area. As a result, the forces arising are guided into the mount 40 with particularly little tension. The magnitude of the mechanical stresses arising in the lens 20 and mount 40 can consequently be kept low.

The region in which the first contact face 28 and the second contact face 48 touch (the so-called touching area or area with Hertzian stresses) has the form of a ring-shaped spherical segment.

The first contact face 28 of the lens 20 can be polished and/or etched. This minimizes micro cracks and/or deep damage and/or crack nuclei in the lens 20. Consequently, the lens 20 can withstand higher pressures.

The form of the first contact face 28 can be produced very precisely. Moreover, the form can be captured very exactly and consequently be assessed using conventional optical measuring methods. Consequently, the first contact face 28 can be produced with very high precision in a technically simple manner. Consequently, the optical system 10 can withstand particularly high pressures, particularly if the second contact face 48 likewise has a very high precision.

By means of the first contact face 28, it is possible to center the lens 20 in the mount 40 or align said lens in a desired position relative to the mount 40.

A side face 27 is arranged between the outer surface 24 of the lens 20 and the first contact face 28 of the lens 20. The side face 27 (also referred to as an outer cylinder) corresponds to the lateral face of a straight circular cylinder. The side face 27 extends in coaxial fashion with respect to the optical axis 29 of the lens 20.

The seal 30 for sealing the region between the first contact face 28 and the second contact face 48 is connected to the mount 40 and covers the region between the side face 27 or the outer cylinder and the mount 40. This can reliably prevent an ingress of water into the region between the first contact face 28 and the second contact face 48.

The optical system 10 can comprise further optical elements in the interior 60. The lens 20 comprises or usually consists of a glass material.

An elastic intermediate layer can be arranged between the first contact face 28 and the second contact face 48. The elastic intermediate layer can lower local surface pressure arising, even when there is a deformation of the first contact face 28. In particular, the intermediate layer can compensate manufacturing inaccuracies and/or signs of settlement. By way of example, the elastic intermediate layer can consist of an elastic material or comprise the latter. If the elastic intermediate layer is present, the first contact face 28 and the second contact face 48 do not directly/immediately touch or contact one another but only do this indirectly.

The elastic intermediate layer and the seal 30 can be embodied in such a way that a self-reinforcing sealing system is present. This means that the sealing effect of the seal 30 or of the intermediate layer increases with increasing pressure on the outer surface 24 of the lens 20. Instead of or in addition to the intermediate layer, an adhesive or a cement can be arranged between the first contact face 28 and the second contact face 48.

If an elastic intermediate layer is present, the thickness thereof can be taken into account when setting the radius of curvature of the second contact face 48. The radii of curvature of the first contact face 28 and of the second contact face 48 then still are substantially the same but can differ slightly from one another (e.g., by less than 1%).

The lens 20 is arranged in the mount 40 in such a way that, when normal pressure (1.01325 bar) prevails in the surroundings 50 of the optical system 10, the first contact face 28 presses against the second contact face 48 with a force that corresponds to the effect of a pressure that is greater than the normal pressure on the outer surface. In particular, the first contact face 28 can press against the second contact face 48 with a force corresponding to a pressure of approximately 50 bar or approximately 100 bar on the outer surface of the lens, while only normal pressure presses on the outer surface of the lens 20. Consequently, movement of the lens 20 in relation to the mount 40 is reliably prevented when the optical system 10 is in surroundings 50 with normal pressure. The first contact face 28 of the lens 20 can be pressed against the second contact face 48 by means of a screw ring 35 or a pre-tensioning ring or a locking ring, even if the pressure of the surroundings 50 corresponds to the pressure in the interior 60 of the optical system 10 (e.g., if the optical system is situated outside of the underwater environment). The screw ring 35 is partially arranged on the outer surface 24 of the lens 20, where necessary with an intermediate element.

Figure 2:
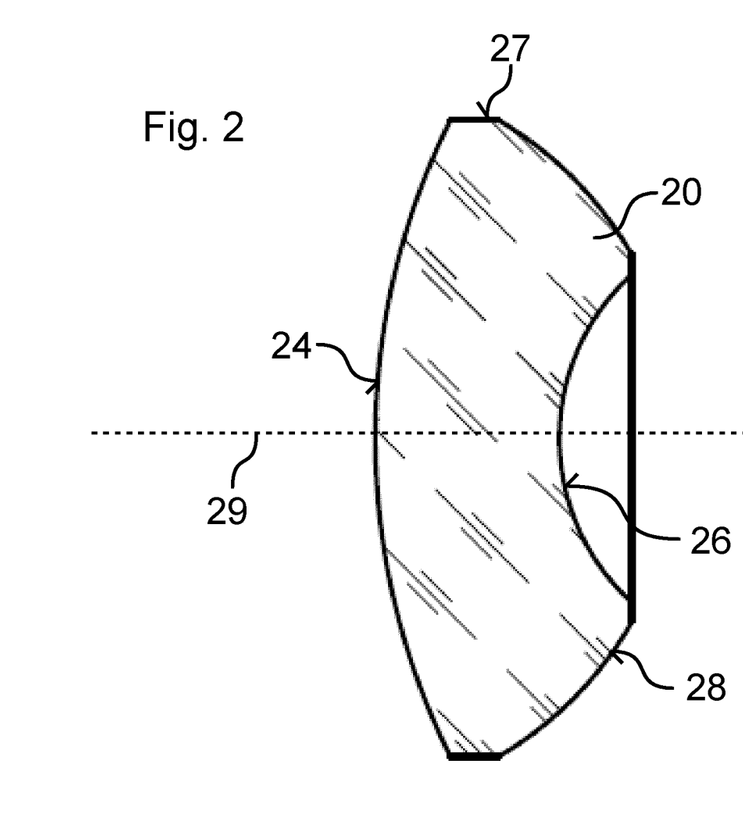
FIG. 2 shows a cross-sectional view of a lens of a second embodiment of the optical system according to the invention.

FIG. 2 shows a cross-sectional view of a lens 20 of a second embodiment of the optical system 10 according to the invention.

The fact that the center of the curvature of the convex first contact face 28 is located on the optical axis 29 of the lens 20 can be identified particularly well in FIG. 2. The side face 27, i.e., the outer face of the lens 20 between the first contact face 28 and the outer surface 24, is larger in FIG. 2 than in the case of the lens 20 in FIG. 1.

Figure 3:
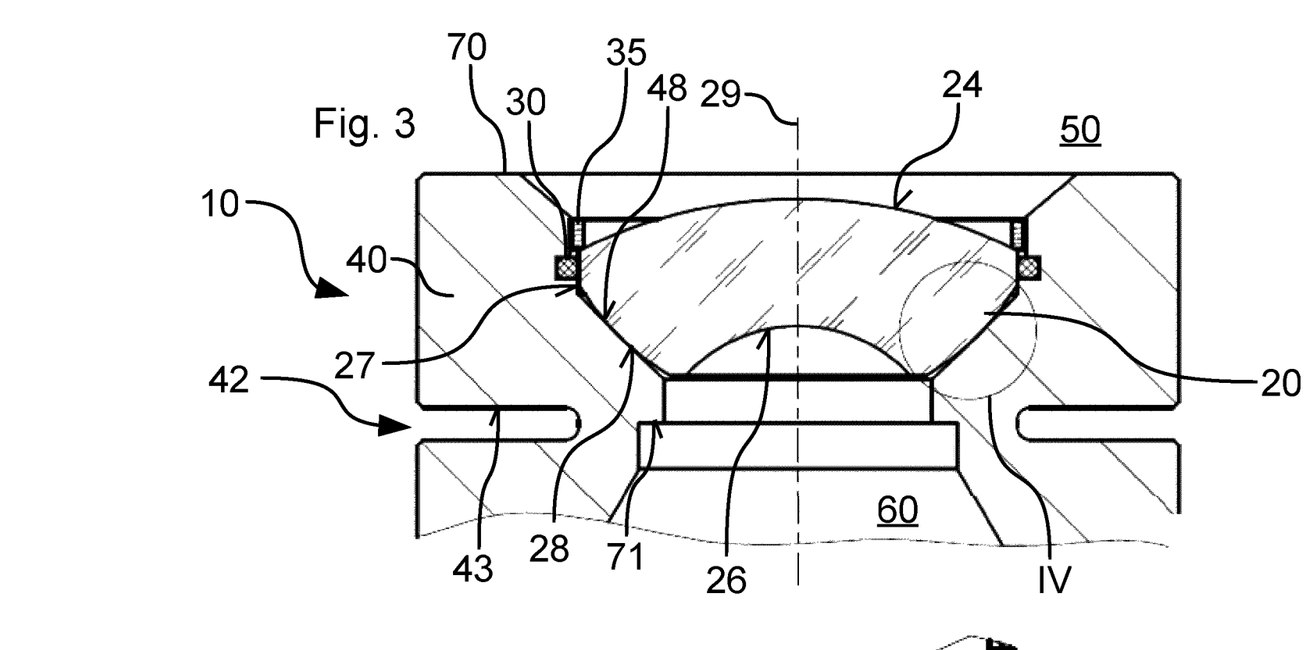
FIG. 3 shows a cross-sectional view of a third embodiment of the optical system according to the invention.
Figure 4:
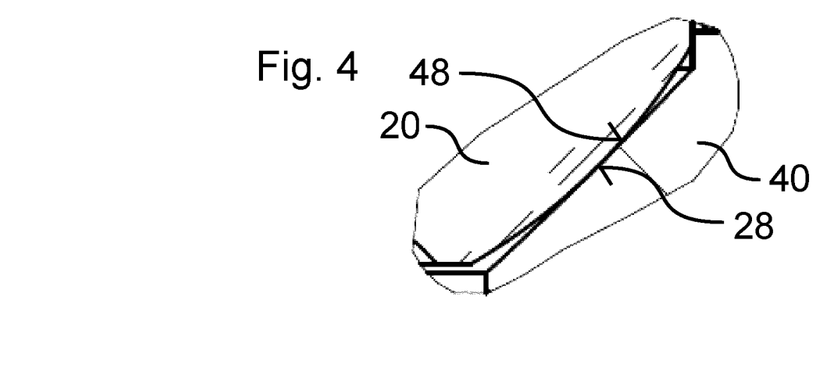
FIG. 4 shows a schematic detailed view of the optical system of FIG. 3.

FIG. 3 shows a cross-sectional view of a third embodiment of the optical system 10 according to the invention. FIG. 4 shows a schematic detailed view of the optical system 10 of FIG. 3.

In the embodiment shown in FIG. 3, the first contact face 28 and the second contact face 48 have a different form than in the embodiment shown in FIG. 1.

The first contact face 28 has a convex form. The center of the curvature of the first contact face 28 is situated on the optical axis 29 of the lens 20. The second contact face 48 has a concave form. The center of the curvature of the second contact face 48 is not located on the optical axis 29 or line of symmetry of the optical system. In the case of an ideal rigid form of the first contact face 28 and of the second contact face 48, the first contact face 28 and the second contact face 48 as a result touch along a line (mathematically considered, so to speak) which extends in a circular, axisymmetric fashion about the optical axis 29. If the first contact face 28 is pressed against the second contact face 48, an area is formed (so-called touching area or area with Hertzian stresses) on account of the elastic deformation of the lens 20 and/or of the mount 40, which area is formed in annular or ring-shaped axisymmetric fashion about the optical axis of the lens 20.

The centers of the curvatures of the first contact face 28 and of the second contact face 48 are situated on a straight line which is perpendicular to the touching area, within which the first contact face 28 and the second contact face 48 touch.

When form deviations and/or dimension deviations arise on account of the load due to the high pressure on the outer surface 24 of the lens 20, the form of the touching area or the area with Hertzian stresses remains substantially unchanged. Only the relative position and size of the touching area or area with Hertzian stresses change. This can be calculated in simulations, for example using the finite element method.

The touching area or area with Hertzian stresses between the first contact face 28 and the second contact face 48 consequently has a form which is symmetric with respect to the axis of symmetry or the optical axis of the lens 20. In the cross sectional view illustrated in FIG. 4, the touching area is punctiform (in the case of an ideal rigid lens 20 and an ideal rigid mount 40). The touching area or area with Hertzian stresses between the first contact face 28 and the second contact face 48 has the form of a ring-shaped funnel section or a lateral face of a conical frustum in reality on account of smaller deformations of the lens 20 and/or the mount 40. The cross section of the touching area or area with Hertzian stresses parallel to the optical axis then has the form of a line.

Should an intermediate layer and/or an adhesive be arranged between the first contact face 28 and the second contact face 48, the two contact faces 28, 48 do not the touch one another immediately/directly. The regions in which the two contact faces 28, 48 would touch if no intermediate layer is present press against one another should an intermediate layer or an adhesive be present.

The radii of curvature of the first contact face 28 and of the second contact face 48 can be determined or optimized in simulations (e.g., using a finite element method) in such a way that the mechanical stresses are limited to such an extent under the pressures to be expected in the underwater environment that these can be withstood by the lens or the optical system without damage. As a result, the lens 20 or the optical system 10 is also able to withstand particularly high pressures.

A seal is arranged between the side face 27 and the mount 40. The seal 30 seals the region between the side face 27 or outer cylinder and the mount 40 in water-tight fashion. This reliably prevents an ingress of water into the region between the first contact face 28 and the second contact face 48 or between the side face 27 and the mount 40.

The mount 40 has an undercut 42 running around the optical axis 29 of the lens 20 or a notch or a constriction. Level with the undercut 42, the mount 40 has a smaller diameter perpendicular to the optical axis 29 of the lens 20 than in the remaining region of the mount 40. The undercut 42 or the faces 43 of the undercut are in fluid connection with the surroundings 50. This means that, for example in an underwater environment, water at the same pressure with which the water presses against the outer surface 24 of the lens 20 and the outer side of the mount is situated in the undercut 42. As a result, bending moments in the region of the first contact face 28 and the second contact face 48 are minimized by the short, direct force path since the water in the undercut 42, as it were, presses against the water pressing on an edge region 70 of the mount 40 which is adjacent to the lens 20. This minimizes or even prevents a deformation of the second contact face 48. Consequently, this prevents the touching area from changing. Expressed differently, the outer face of the housing or of the mount 40 and the faces 43 of the undercut 42 are subjected to the same pressure level with the undercut 42. Consequently, there is a short, direct force flow without bending moments in the edge region of the mount 40. As a result, the bending load on the mount 40 is minimized in regions of the first contact face 28 and the second contact face 48.

Level with the undercut 42, the mount 40 has a diameter perpendicular to the optical axis 29 of the lens 20 (the optical axis 29 extends from top to bottom or vice versa in FIG. 3) which substantially corresponds to the diameter of the lens 20 perpendicular to the optical axis 29 of the lens 20. As a result, the bending load and, resulting therefrom, the deformation of the part of the mount 40 is minimized in the region of the second contact face 48. In an underwater environment, the water in the undercut 42 presses against the water pressing on the part or the edge region 70 of the mount 40 which is level with the outer surface 24 of the lens 20 (the height extends from top to bottom or vice versa in FIG. 3). Consequently, bending moments are kept away from the first contact face 28 and the second contact face 48.

The optical system 10 comprises further optical elements (e.g., further lenses, CCD sensors, etc.) (not shown). The further optical elements are fastened to a plane face 71 of the mount 40 facing away from the lens 20 or the second contact face 48 and not immediately/directly fastened to further parts of the housing next to the mount 40. In the case of an axial displacement (i.e., in the case of a displacement along the optical axis 29) of the lens 20 and the mount 40 in relation to the further parts of the housing on account of the water pressure in the surroundings 50, the further optical elements are displaced by the same magnitude with which the lens 20 is displaced. Consequently, the distances between the optical elements of the optical system 10 remain unchanged, independently of the pressure in the surroundings 50. Consequently, the optical imaging quality of the optical system 10 remains unchanged.

In the drawings, the housing or the mount 40 is only illustrated in part in each case.

LIST OF REFERENCE SIGNS

10 Optical system
20 Lens
24 Outer surface
26 Inner surface
27 Side face
28 First contact face
29 Optical axis of the lens
30 Seal
35 Screw ring
40 Mount
42 Undercut
43 Face of the undercut
48 Second contact face
50 Surroundings
60 Interior
70 Edge region of the mount
71 Plane face of the mount

The invention claimed is:

1. An optical system (10) for use in an underwater environment, wherein the optical system (10) comprises
a housing which delimits an interior (60) of the optical system (10) with respect to the surroundings (50) in water-tight fashion, and
a lens (20) with an outer surface (24),
wherein the housing comprises a mount (40), wherein the lens (20) is received in the mount (40) in such a way that the outer surface (24) of the lens (20) is in fluid contact with water of the underwater environment when the optical system (10) is situated in the underwater environment,
wherein the outer surface (24) of the lens (20) has an arched form,
wherein the lens (20) has a first arched contact face (28), and the mount (40) has a second contact face (48),
wherein the lens (20) is arranged in the mount (40) in such a way that the first contact face (28) presses against the second contact face (48) when the pressure of the surroundings (50) of the optical system (10) is greater than the pressure in the interior (60) of the optical system (10),
wherein the first contact face (28) has a convex form,
wherein the second contact face (48) has a concave form, wherein the radius of curvature of the first contact face (28) is smaller than the radius of curvature of the second contact face (48) in a cross section along a plane containing the optical axis (29) of the lens (20), and wherein the center of the concave form of the second contact face (48) is not located on an optical axis (29) of the lens (20).

2. The optical system (10) as claimed in claim 1, wherein the center of the spherical form of the first contact face (28) is located on an optical axis (29) of the lens (20).

3. The optical system (10) as claimed in claim 2, wherein the lens (20) has an inner surface (26) opposite to the outer surface (24), wherein an optical axis (29) of the lens (20) extends through the outer surface (24) and the inner surface (26), and wherein the inner surface (26) of the lens (20) has an arched form.

4. The optical system (10) as claimed in claim 1, wherein the lens (20) has an inner surface (26) opposite to the outer surface (24), wherein an optical axis (29) of the lens (20) extends through the outer surface (24) and the inner surface (26), and wherein the inner surface (26) of the lens (20) has an arched form.

5. The optical system (10) as claimed in claim 1, wherein an elastic intermediate layer and/or an adhesive is arranged between the first contact face (28) and the second contact face (48).

6. The optical system (10) as claimed in claim 5, wherein the elastic intermediate layer and/or the adhesive is formed in such a way that a sealing effect between the lens (20) and the mount (40) is increased when the pressure on the outer surface (24) of the lens (20) increases.

7. The optical system (10) as claimed in claim 1, wherein the mount (40) has an undercut (42), wherein faces (43) of the undercut (42) have a fluid connection with the underwater environment when the optical system (10) is situated in the underwater environment.

8. The optical system (10) as claimed in claim 7, wherein the undercut (42) is embodied in such a way that, level with the undercut (42), the mount (40) has a diameter perpendicular to the optical axis (29) of the lens (20) which corresponds to the diameter of the lens (20) perpendicular to the optical axis (29) of the lens (20).

9. The optical system (10) as claimed in claim 8, wherein the optical system (10) comprises further optical elements, wherein the further optical elements are rigidly connected to a part of the mount (40) in such a way that, when the lens (20) moves with the mount (40) relative to the remaining parts of the housing, the further optical elements are moved along accordingly in such a way that there are no changes in the distances between the lens (20) and the further optical elements.

10. The optical system (10) as claimed in claim 1, wherein the optical system (10) comprises further optical elements, wherein the further optical elements are rigidly connected to a part of the mount (40) in such a way that, when the lens (20) moves with the mount (40) relative to the remaining parts of the housing, the further optical elements are moved along accordingly in such a way that there are no changes in the distances between the lens (20) and the further optical elements.

11. The optical system (10) as claimed in claim 1, wherein the first contact face (28) of the lens (20) is polished and/or etched.

12. The optical system (10) as claimed in claim 1, wherein the lens (20) is arranged with pretension in the mount (40) in such a way that the lens (20) presses against the second contact face (48) with its first contact face (28) even if the pressure in the surroundings of the optical system (10) equals the pressure in the interior (60) of the optical system (10).

13. The optical system (10) as claimed in claim 1, wherein a side face (27) in the form of a lateral face of a cylinder is formed between the outer surface (24) of the lens (20) and the first contact face (28) of the lens (20).

14. The optical system (10) as claimed in claim 13, wherein
the side face (27) extends in coaxial fashion with respect to the optical axis (29) of the lens (20).

15. The optical system (10) as claimed in claim 1, wherein the optical system (10) further comprises a seal (30) for sealing a region between the first contact face (28) of the lens (20) and the second contact face (48) of the mount (40).

16. The optical system (10) as claimed in claim 1, wherein the outer surface (24) of the lens (20) has a spherical convex form.

* * * * *